US010891563B2

(12) United States Patent
Nie

(10) Patent No.: US 10,891,563 B2
(45) Date of Patent: *Jan. 12, 2021

(54) SYSTEMS AND METHODS FOR EVENT ADMISSIONS BASED ON FINGERPRINT RECOGNITION

(71) Applicant: StubHub, Inc., San Francisco, CA (US)

(72) Inventor: Yongzhi Nie, Shanghai (CN)

(73) Assignee: STUBHUB, INC., San Francisco, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 15/997,474

(22) Filed: Jun. 4, 2018

(65) Prior Publication Data

US 2018/0276577 A1 Sep. 27, 2018

Related U.S. Application Data

(63) Continuation of application No. 14/588,316, filed on Dec. 31, 2014, now Pat. No. 9,990,593.

(51) Int. Cl.
*G06Q 10/02* (2012.01)
*G06Q 20/04* (2012.01)
(Continued)

(52) U.S. Cl.
CPC ........... *G06Q 10/02* (2013.01); *G06Q 20/045* (2013.01); *G06Q 20/0457* (2013.01);
(Continued)

(58) Field of Classification Search
CPC .. G06Q 10/02; G06Q 20/045; G06Q 20/0457; G06Q 20/322; G06Q 20/382;
(Continued)

(56) References Cited

U.S. PATENT DOCUMENTS 7,004,388 B2 * 2/2006 Kohta ................ G06Q 20/4014
235/381
8,345,939 B2 1/2013 Kountotsis
(Continued)

OTHER PUBLICATIONS

Peter Raisbeck, (Biometric Futures: Global Biometrics and the Architectural Production of Intelligent Buildings), (Year: 2008).*

(Continued)

*Primary Examiner* — George Chen
*Assistant Examiner* — Ibrahim N El-Bathy
(74) *Attorney, Agent, or Firm* — Maschoff Brennan

(57) ABSTRACT

Systems and methods for fingerprint recognition-based event admission are provided. A user may use a user device to purchase a ticket for an event and provide a fingerprint scanned on the user device to a fingerprint validation system. The fingerprint validation system may associate the purchased ticket with the user and store the fingerprint template associated with the user as a reference template. When the user arrives at an entrance of the event, the user may scan a fingerprint at a fingerprint scan device at the entrance. Fingerprint validation system may compare the received fingerprint template with stored fingerprint reference templates, validate that the user is associated with a purchased ticket, and grant access to the event.

20 Claims, 6 Drawing Sheets

(51) Int. Cl.
*G06Q 20/38* (2012.01)
*G06Q 20/32* (2012.01)
*G06Q 20/40* (2012.01)
*G07C 9/27* (2020.01)
*G07C 9/25* (2020.01)
*G06K 9/00* (2006.01)

(52) U.S. Cl.
CPC ......... *G06Q 20/322* (2013.01); *G06Q 20/382* (2013.01); *G06Q 20/40145* (2013.01); *G07C 9/257* (2020.01); *G07C 9/27* (2020.01); *G06K 9/00087* (2013.01)

(58) Field of Classification Search
CPC .......... G06Q 20/40145; G07C 9/00087; G07C 9/00103; G06K 9/00087
See application file for complete search history.

(56) References Cited

U.S. PATENT DOCUMENTS

| | | |
|---|---|---|
| 9,990,593 B2 | 6/2018 | Nie |
| 2002/0040346 A1* | 4/2002 | Kwan .................... G06Q 10/02 705/51 |
| 2003/0101134 A1* | 5/2003 | Liu ........................ G06Q 20/04 705/39 |
| 2006/0153433 A1* | 7/2006 | Lo .................... G11B 20/00086 382/124 |
| 2007/0156443 A1 | 7/2007 | Gurvey |
| 2008/0130956 A1* | 6/2008 | Jordan .................... G07C 9/22 382/115 |
| 2013/0046690 A1* | 2/2013 | Calman .................. G06Q 40/02 705/44 |
| 2013/0167203 A1 | 6/2013 | Etchegoyen |

OTHER PUBLICATIONS

Non-Final Office Action received for U.S. Appl. No. 14/588,316 dated Aug. 21, 2017, 32 pgs.
Response to Non-Final Office Action filed Nov. 21, 2017, for U.S. Appl. No. 14/588,316, dated Aug. 21, 2017, 19 pgs.
Examiner-Initiated Interview Summary received for U.S. Appl. No. 14/588,316, dated Feb. 5, 2018, 2 pgs.
Notice of Allowance received for U.S. Appl. No. 14/588,316, dated Feb. 5, 2018, 14 pgs.
Raisbeck, et al., "Biometric Futures: Global Biometrics and the Architectural Production of Intelligent Buildings", Faculty of Architecture, Building and Planning Melbourne University, 2008, 10 pgs.

* cited by examiner

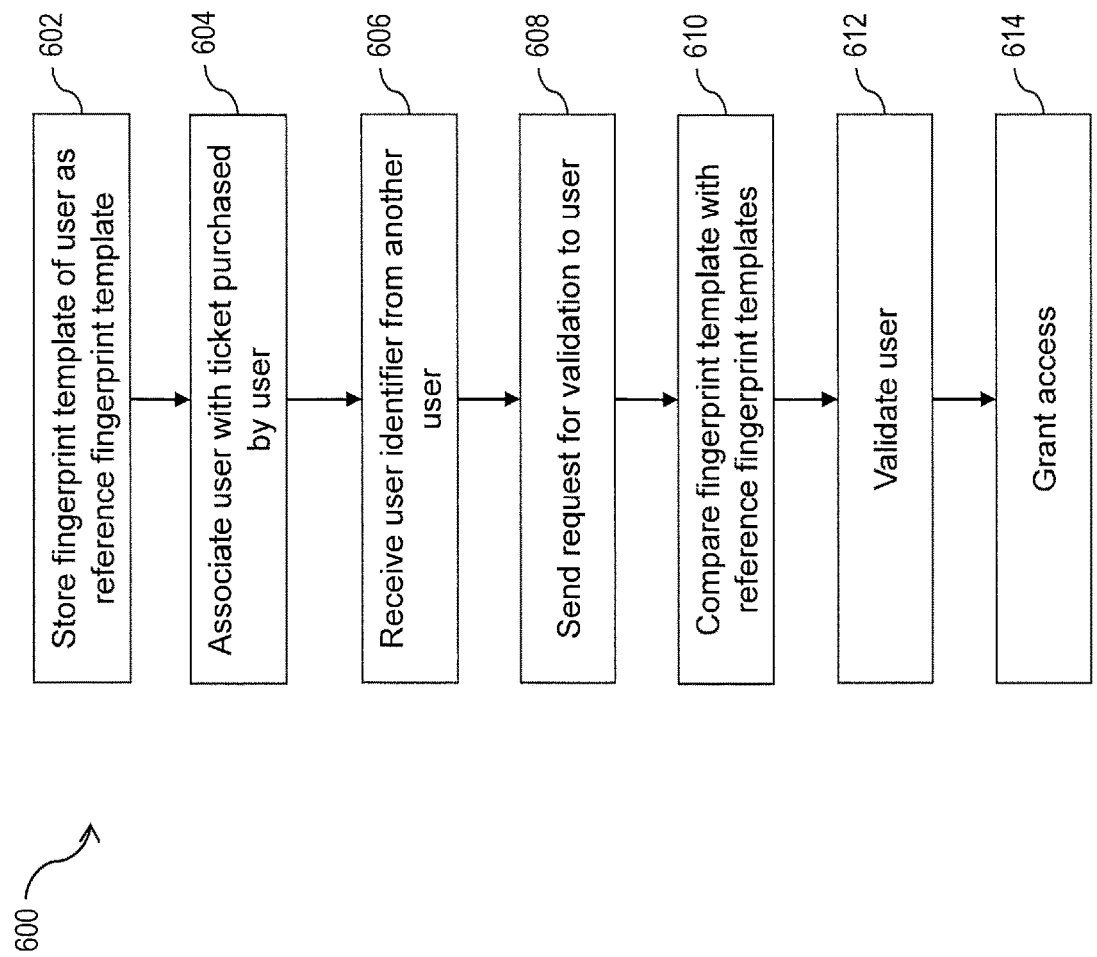

SYSTEMS AND METHODS FOR EVENT ADMISSIONS BASED ON FINGERPRINT RECOGNITION

CROSS-REFERENCE TO RELATED APPLICATIONS

This application is a continuation of U.S. patent application Ser. No. 14/588,316, filed on Dec. 31, 2014; the disclosure of which is incorporated by reference herein.

BACKGROUND

Field of the Invention

The present invention generally relates to biometrics and, more particularly, to using fingerprint recognition for admission to events.

Related Art

Various online ticket sellers provide websites through which parties can buy and sell tickets online. These tickets can be obtained by a user to reserve seats and/or admission for a variety of events, such as sporting events, concerts, theater events, and other entertainment events. Typically, a buyer looks for available tickets on a ticket marketplace website or other online listing and decides which, if any, of the available tickets are of interest to the buyer for possible purchase. When a ticket is purchased and the ticketholder goes to the associated event, users typically present a physical ticket, such as a paper ticket, for admission to the event.

BRIEF DESCRIPTION OF THE DRAWINGS

FIG. 6 is a flowchart showing an illustrative process that may be performed for using remote fingerprint recognition for event admission according to an embodiment.

DETAILED DESCRIPTION

Figure 1:
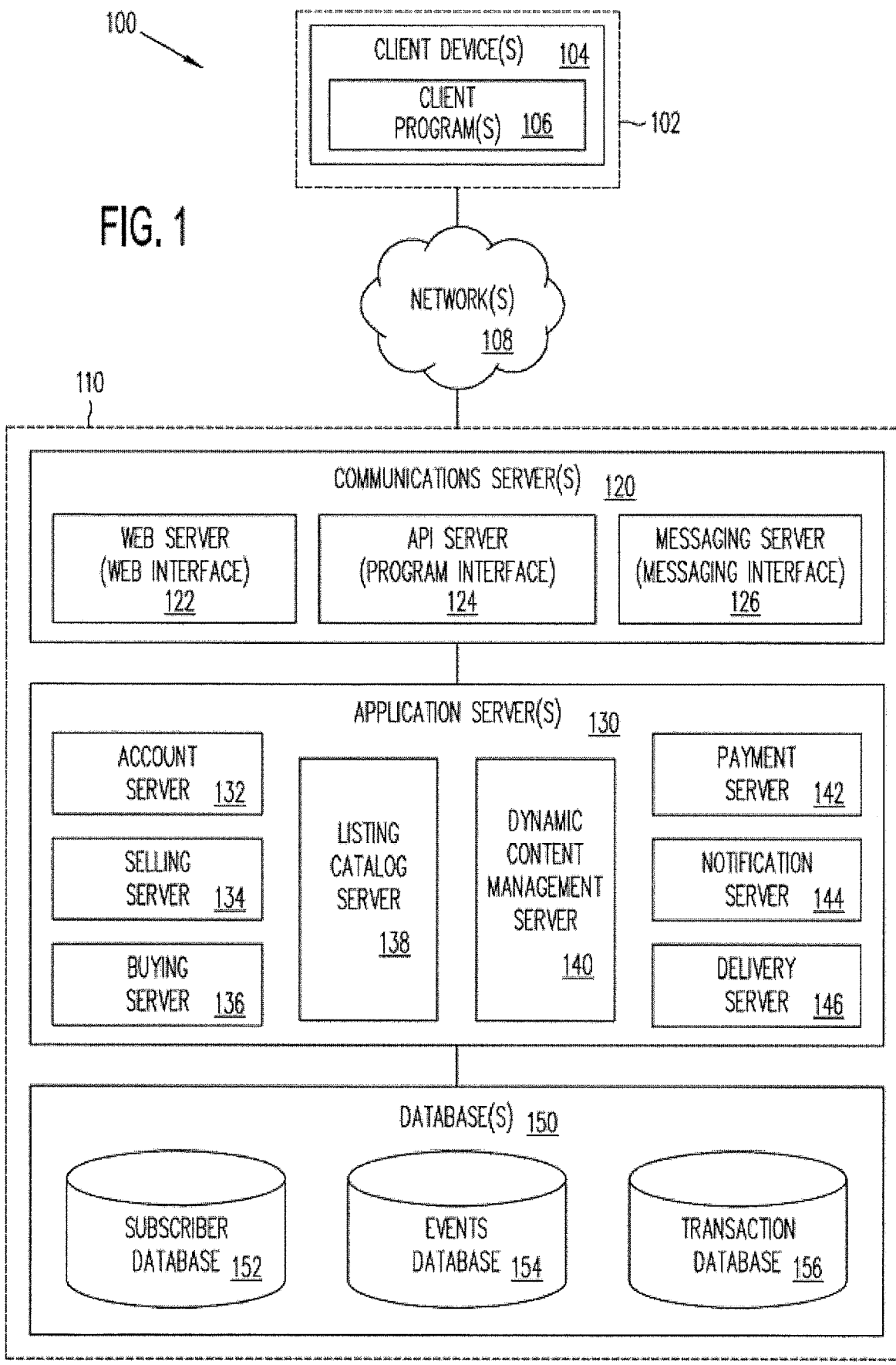
FIG. 1 is a block diagram of an illustrative computing system that is adapted for implementing the selection and purchase of tickets and/or fingerprint recognition-based event admission according to an embodiment.

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

Devices, systems, and methods are provided for performing activities related to online ticket sale, online ticket purchase, and ticketless event admission using fingerprint recognition. In various particular embodiments, the devices, systems, or methods can involve one or more devices in communication over a network. Such devices, systems, and methods can facilitate fingerprint recognition for event admission.

While the various examples disclosed herein focus on particular aspects regarding the online sale of tickets, online purchase of tickets, and/or fingerprint recognition-based admission to ticketed events, it will be understood that the various inventive principles and embodiments disclosed herein can be applied to other types of ticketed applications and arrangements as well. For example, a ticket purchase that is performed in person or on a closed or proprietary computing system may utilize one or more of the aspects and features found in the various systems and methods provided.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these are not necessarily all referring to the same embodiment. Furthermore, the particular features, structures, or characteristics may be combined in any suitable manner in one or more embodiments.

The present disclosure provides systems and methods for ticketless event admission using fingerprint recognition. The systems and methods described provide enhanced user experience when going to events because users no longer need to carry tickets or other forms of identification or authentication. Events may include social, recreational, or entertainment events, such as concerts, musicals, shows, fairs, amusement parks, sporting events, and the like. Alternatively, events may include business related events, such as business meetings, conferences, retreats, and the like.

In various embodiments, a service provider may provide tickets for sale through a website or an application associated with the service provider. A service provider server associated with the service provider may maintain a database containing information relating to events and tickets for the events. The service provider may provide fingerprint recognition-based event admission services via the service provider server.

A user may use a user device to buy a ticket for an event via the service provider server. The user may use the user device to scan his or her fingerprint and transmit fingerprint data (e.g., a fingerprint sample, a fingerprint sample, etc.) to the service provider before, at the time of, or after purchasing the ticket. The service provider server may receive the fingerprint data and store the fingerprint data in a fingerprint template database on a hardware storage drive of the service provider server. The service provider server may associate the fingerprint data with a user account of the user and/or the ticket purchase transaction.

When the user arrives at an entrance for the event, the user may scan his or her fingerprint at a fingerprint scan device at the entrance and enter the event without providing other information. When the user scans his or her finger, the fingerprint scan device may transmit fingerprint data to the service provider server. The service provider server may use the fingerprint data received from the fingerprint scan device to identify the user and/or authenticate the user based on comparing the received fingerprint data with fingerprint data stored in the fingerprint template database. Thus, the user can enter the event conveniently without carrying a ticket or other forms of verification.

In various embodiments, the user device or the fingerprint scan device senses and/or scans a fingerprint to capture a fingerprint sample, which may be an image of a fingerprint. The user device, the fingerprint scan device, or the service provider server may process the fingerprint sample to generate a fingerprint template, which includes relevant features and/or characteristics extracted from the fingerprint sample. Relevant features/characteristics may include, for example, patterns (e.g., characteristics of ridges) and/or minutia points (e.g. unique features within the patterns.

In various embodiments, the service provider server may compare a fingerprint template that is based on a fingerprint scan on the fingerprint scan device or the user device with reference fingerprint templates stored in the fingerprint template database. The reference fingerprint templates may include a fingerprint template of the user that is based on a previous fingerprint scan on the user device, for example, when purchasing the ticket.

Advantageously, the user does not have to train the fingerprint scan device, in a process called "enrollment," by providing a fingerprint scan to the fingerprint scan device because a reference template for the user based on a fingerprint scan on the user device is previously stored in the fingerprint template database. Accordingly, the user may conveniently go to the fingerprint scan device at an entrance for an event without a physical ticket or authenticating information even if it is the user's first time using the fingerprint recognition-based event admission services provided by the service provider.

Beginning with FIG. 1, an exemplary embodiment of a computing system adapted for implementing the selection and purchase of tickets and/or fingerprint recognition-based event admission is illustrated in block diagram format. As shown, a computing system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases, and other elements, a client 102 that may comprise or employ one or more client devices 104, such as a laptop, a mobile computing device, a personal computer (PC), and/or any other computing device having computing and/or communications capabilities in accordance with the described embodiments. In particular, it is specifically contemplated that client devices 104 can include a smartphone, a cellular telephone, or other mobile device that a user can carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™ Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, instant messaging (IM), short message service (SMS), multimedia messaging service (MMS), telephone, voicemail, voice over internet protocol (VoIP), video messaging, etc.), contacts application, calendar application, electronic document application, database application, media application (e.g., music, video, television), location-based services (LBS) application (e.g., global positioning system (GPS), mapping, directions, point-of-interest, locator, etc.), and so forth. One or more of client programs 106 may display various graphical user interfaces (GUIs) to present information to and/or receive information from one or more of client devices 104.

As shown, client 102 can be communicatively coupled via one or more networks 108 to a network-based system 110. Network-based system 110 may be structured, arranged, and/or configured to allow client 102 to establish one or more communications sessions with network-based system 110 using various computing devices 104 and/or client programs 106. Accordingly, a communications session between client 102 and network-based system 110 (e.g., a communications session for transmitting fingerprint data, such as a fingerprint sample or a fingerprint template) may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data and/or voice communications between client 102 and the network-based system 110 may be sent and received over one or more networks 108 such as the Internet, a wide area network (WAN), a wireless wide area network (WWAN), a local area network (LAN), a wireless local area network (WLAN), a mobile telephone network, a landline telephone network, a VoIP network, as well as other suitable networks. For example, client 102 may communicate with network-based system 110 over the Internet or other suitable WAN by sending and or receiving information via interaction with a web site, e-mail, 1M session, and/or video messaging session. Any of a wide variety of suitable communication types between client 102 and system 110 can take place, as will be readily appreciated. In particular, wireless communications of any suitable form may take place between client 102 and system 110, such as that which often occurs in the case of mobile phones or other personal mobile devices.

Network-based system 110 may comprise one or more communications servers 120 to provide suitable interfaces that enable communication using various modes of communication and/or via one or more networks 108. Communications servers 120 can include a web server 122, an API server 124, and/or a messaging server 126 to provide interfaces to one or more application servers 130. Application servers 130 of network-based system 110 may be structured, arranged, and/or configured to provide various online marketplace, ticket fulfillment services, and/or fingerprint recognition services to users that access network-based system 110. In various embodiments, client 102 may communicate with applications servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 to the various services and functions provided by application servers 130.

When implemented as an online ticket marketplace, application servers 130 of network-based system 110 may provide various online marketplace and ticket fulfillment services including, for example, account services, buying services, selling services, listing catalog services, delivery services, payment services, gathering services, and notification services. Application servers 130 may include an account server 132, a selling server 134, a buying server 136, a listing catalog server 138, a dynamic content management server 140, a payment server 142, a notification server 144, and/or a delivery server 146 structured and arranged to provide such online marketplace and ticket fulfillment and/or redistribution services.

Application servers 130, in turn, may be coupled to, and capable of accessing, one or more databases 150 including a subscriber database 152, an active events database 154, and/or a transaction database 156. Databases 150 generally may store and maintain various types of information for use by application servers 130, and may comprise or be implemented by various types of computer storage devices (e.g., servers, memory) and/or database structures (e.g., relational, object-oriented, hierarchical, dimensional, network) in accordance with the described embodiments.

Figure 2:
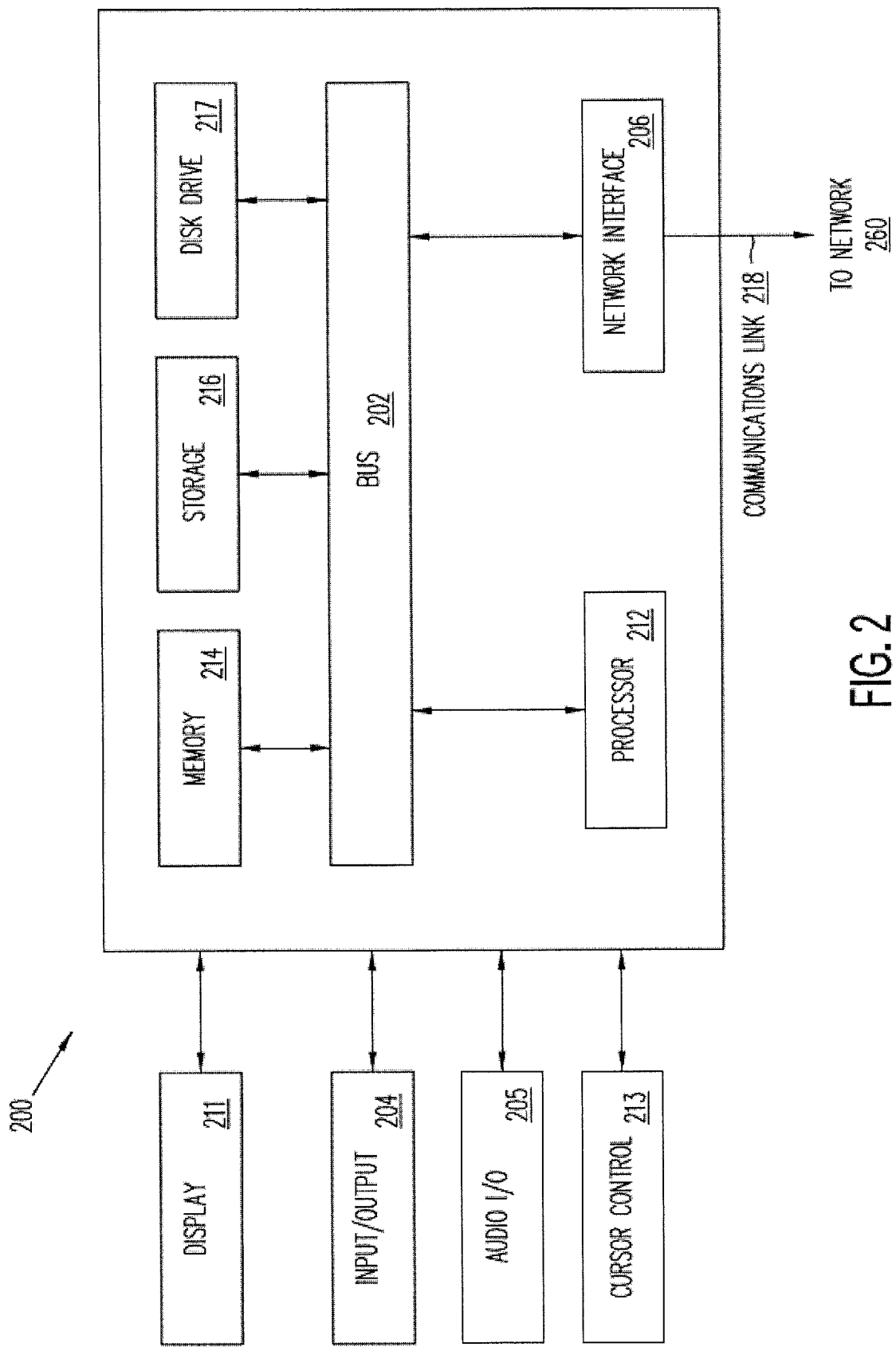
FIG. 2 is a block diagram of an illustrative computer system suitable for implementing on one or more devices of the computing system in FIG. 1 according to an embodiment.
Figure 3:
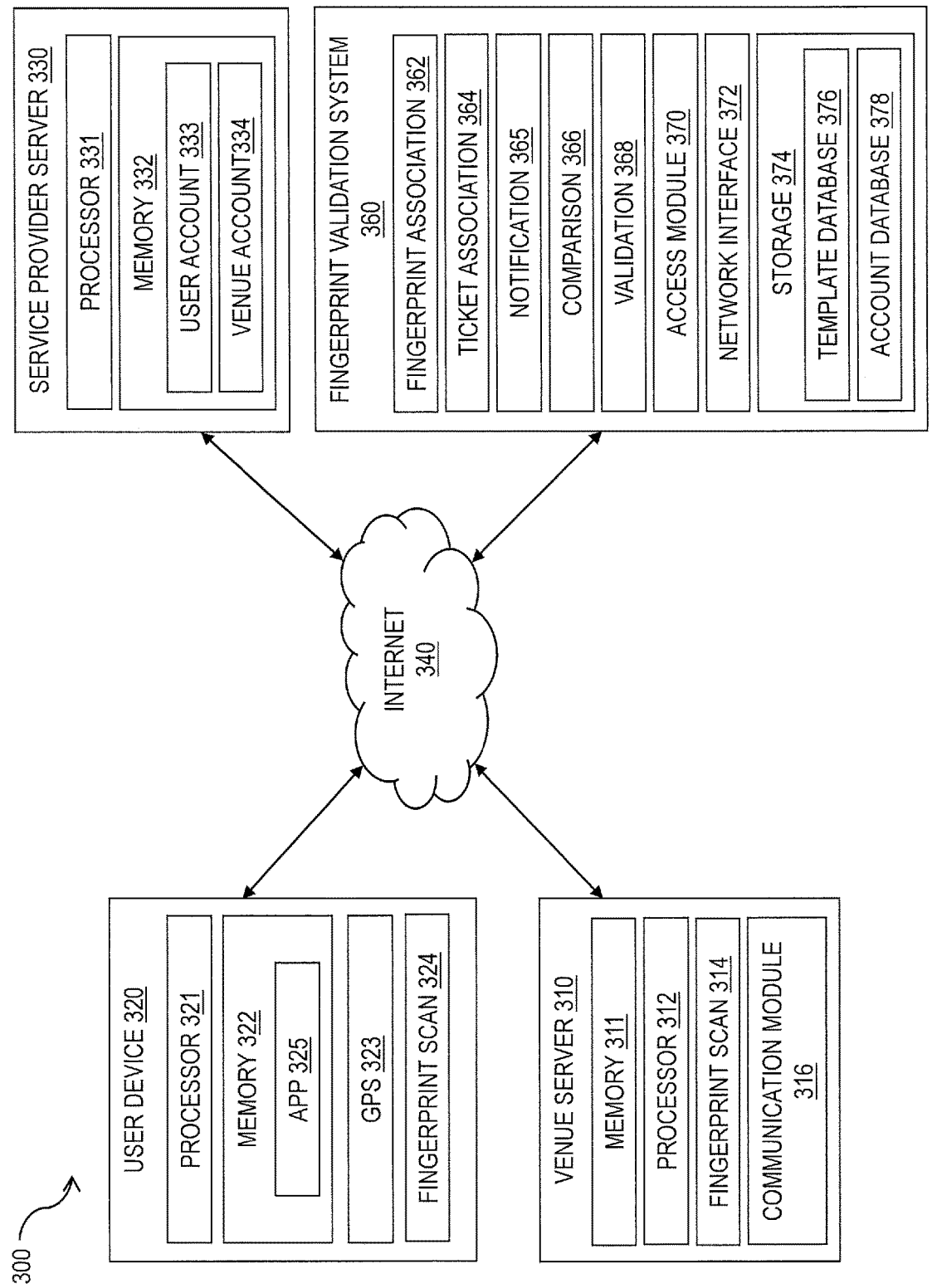
FIG. 3 is a block diagram of an illustrative system for facilitating event admission using fingerprint recognition according to an embodiment.

Continuing with FIG. 2, an exemplary computer system 200 suitable for implementing on one or more devices, servers, and systems in FIG. 1 and/or FIG. 3 is depicted in block diagram format. In various implementations, a device that includes computer system 200 may comprise a personal computing device (e.g., a smart or mobile phone, a wearable computing device, such as glasses or a smart watch, a computing tablet, a personal computer, laptop, PDA, Bluetooth device, key FOB, badge, etc.) that is capable of communicating with a network. A service provider, such as a ticket provider and/or a payment provider, may utilize a network computing device (e.g., a network server) that includes computer system 200 capable of communicating with the network. It should be appreciated that each of the devices utilized by users, venues, and/or service providers may be implemented as computer system 200 in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as a user device, a merchant server, a venue server, a payment provider server, and/or a service provider server via a network 260. In various embodiments, such as for many cellular telephone and other mobile device embodiments, this transmission can be wireless, although other transmission mediums and methods may also be suitable. A processor 212, which can be a micro-controller, digital signal processor (DSP), or other processing component, processes these various signals, such as for display on computer system 200 or transmission to other devices over network 260 via a communication link 218. Again, communication link 218 can simply be a wireless communication form in some embodiments. Processor 212 may also control transmission of information, such as cookies or IP addresses, to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory machine-readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to network 260 (e.g., such as a LAN, WLAN, PTSN, and/or various other wired or wireless networks, including telecommunications, mobile, and cellular phone networks) may perform instruction sequences to practice the present disclosure in coordination with one another. Modules described herein can be embodied in one or more computer readable media or be in communication with one or more processors to execute or process the steps described herein.

A computer system may transmit and receive messages, data, information, and instructions, including one or more programs (i.e., application code), through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, servers, and numerous variations thereof can be used to implement a fingerprint recognition operation during admission to a purchased-access event.

FIG. 3 is a block diagram 300 showing a fingerprint recognition-based admission system that may be used to store reference fingerprint templates associated with users, associate purchased tickets with users, compare a fingerprint template with reference fingerprint templates, validate that a user is associated with a purchased ticket for an event, and grant access to the event according to an embodiment. As shown in FIG. 3, the fingerprint recognition-based admission system may include a venue server or device 310, a user device 320, a service provider server 330, and/or a fingerprint validation system 360.

In some embodiments, a venue device such as a venue device 310 (sometimes referred to herein as a venue server or a venue system) can be present at each of a plurality of different event venues (e.g., stadiums, theaters, arenas, amphitheaters, airplanes, cruise ships, hotels, or other venues at which ticketed events are held or for which access to restricted portions of the venue can be purchased for a period of time). Venue server 310 can provide information regarding events scheduled to occur at a particular venue and regarding seating and/or other accommodations (e.g., hotel rooms, cruise ship cabins, etc.) at that venue. In some embodiments, venue server 310 can provide the information to service provider server 330. Service provider server 330 can obtain information regarding events scheduled to occur at various venues and information regarding seating and/or other accommodations at the various venues from one or more venue devices (servers) 310, from other sources, or service provider server 330 may have a database of event information and venue information independent of any interaction with a venue device. Service provider server 330 may, for example, be an implementation of system 110 of FIG. 1.

Venue server 310 can be a system that includes one or more computers, one or more servers, one or more computing tablets, one or more mobile devices, communications equipment, one or more devices configured to scan fingerprints and/or other suitable computing equipment, as examples. Venue device 310 can have processing circuitry such as a processor 312 and storage such as a memory 311. Venue device 310 may, according to some embodiments, include one or more fingerprint scan devices such as one or more fingerprint scan devices 314 and communications equipment such as a communications module 316.

Processor 312 can execute a software program stored in memory 311 for providing information regarding events scheduled to be at the venue, regarding seating at the venue, or other information for each scheduled or ongoing event. Venue device 310 can provide the information to the service provider server and/or to a user device such as user device 320.

Fingerprint scan device 314 may scan a fingerprint of a user, create a fingerprint sample based on the scan, and/or process the fingerprint sample by extracting features to generate a fingerprint template. Fingerprint scan device 314 may be a computer, a computing tablet, or a mobile device configured to scan a fingerprint of users, as examples. Alternatively, fingerprint scan device 314 may be a specialized device for scanning fingerprints, or integrated with automated entrances gates, such as automated turnstile entrance gates.

Communication module 316 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication (NFC) devices. Fingerprint scan device 314 may utilize communications circuitry such as communication module 316 to communicate with user device 320, service provider server 330, and/or fingerprint validation system 360. In various embodiments, fingerprint scan devices 314 may be operated by the venue, by a service provider server, or by another service such as a payment provider.

Venue device 310 can be disposed at the venue. However, this is merely illustrative. If desired, venue device 310 can be disposed at a location other than the venue. Each venue can have a dedicated venue device 310 or a plurality of different venues can share a common venue device 310. For example, co-owned venues can share a common venue device 310.

In some embodiments, venue device 310 can be omitted if one or more fingerprint scan devices at venues are provided by a service provider or a third-party.

A user (e.g., an event attendee) can use a device such as user device 320 to shop online for available tickets and/or provide his or her fingerprint data (e.g., a fingerprint sample, a fingerprint template, etc.). User device 320 can be a mobile device such as a cellular telephone, a tablet computer, a laptop computer, or another portable computing device. User device 320 can be a non-mobile device such as a home (land line) telephone, a desktop computer, an interactive set top box, or the like. User device 320 can be any device or combination of devices that facilitate viewing, selection, and purchasing of online tickets, and/or scanning a fingerprint and transmitting fingerprint data. User device 320 may, for example, be an implementation of client device 104 of FIG. 1.

User device 320 can have a processor 321, a memory 322, a global positioning system component (GPS) 323, fingerprint scan module 324, and/or other suitable device components. Fingerprint scan module 324 may be integrated as a part of user device 320 and configured to scan a fingerprint. Alternatively, fingerprint scan module 324 may be a separate hardware unit that can be coupled to user device 320 via wireless or wired communication. Processor 321 can execute an application such as an app 325 that facilitates ticket selection, purchase, and/or fingerprint recognition-based event admission methods disclosed herein. App 325 can be stored in a memory 322. App 325 can provide a graphical user interface (GUI) for the user when the user is selecting and purchasing tickets. If desired, app 325 can be a dedicated ticket purchasing and fingerprint scanning app. However, this is merely illustrative. In some configurations, app 325 can be part of another app, such as a PayPal, Inc. payment provider app.

User device 320 can communicate with venue device 310, service provider server 330, and/or fingerprint validation system 360 via a network such as the Internet 340. User device 320 can communicate with Internet 340 via either a wired connection or a wireless connection. App 325 may be configured to transmit fingerprint data (e.g., a fingerprint sample, a fingerprint template, etc.) to service provider server 330 and/or fingerprint validation system 360. For example, service provider server 330 may have access to fingerprint data for a user based on fingerprint data from fingerprint scan module 324. Further, app 325 may be configured to transmit to service provider server 330 location information of user device 320. For example, service provider server 330 may have access to location information for a user based on location data from GP S 323.

Service provider server 330 may be operated by an online ticket seller such as StubHub, Inc. Service provider server 330 may facilitate online ticket sales and/or fingerprint recognition-based event admission. Service provider server 330 may include processing circuitry such as a processor 331 in communication with storage such as a memory 332. Processor 331 can include one or more processors. Processor 331 can access accounts such as a user account in a user database 333 and/or a venue account in a venue database 334 that are stored in memory 332. A user account can include information regarding the user (e.g., identification information, preferences, account numbers, purchase history, purchased-ticket event information, attended event information, etc.). A venue account can include information regarding the venue (e.g., information regarding events, seating, venue location, and other venue features). Memory 332 can be separate from the service provider server 330 and can be used to store any number of user accounts and venue accounts. Memory 332 can be distributed, e.g., have portions thereof disposed at a plurality of different locations. Other accounts may also be accessible by processor 331, such as accounts of users selling tickets that include ticket details, such as price, quantity, location, and event information, and financial information that enable funds to be deposited into seller accounts when their tickets are sold.

Service provider server 330 may include one or more servers located at one or more locations. Thus, the service provider server 330 can be geographically and operationally distributed if desired. Service provider server 330 can be part of another system, such as a payment provider system or a fingerprint recognition-based event admission system. Service provider server 330 may include another system, such as fingerprint validation system 360. Service provider server 330 can communicate with venue device 310 over a wired or wireless connection such as via a network such as Internet 340. Service provider server 330 can communicate with a plurality of different venue devices 310. Venue device 310 can communicate with a plurality of different service provider servers 330. A plurality of different service provider servers 330 can communicate among themselves and can be considered herein as being the same as a single service provider server 330, A user can operate user device 320 to interact with service provider server 330 so that the user can select, purchase, and/or sell tickets. The user can operate user device 320 and/or fingerprint scan device 314 to scan a fingerprint and send fingerprint data to service provider server 330 and/or fingerprint validation system 360

Service provider server 330 can communicate with venue device 310 to obtain information about the venue. For example, service provider server 330 can communicate with venue device 310 to obtain information regarding the scheduling of events at the venue and regarding features of the venue. The features of the venue can be dependent upon the events of the venue, e.g., the features of the venue can vary from event to event. Generally, venue device 310, user device 320, and service provider server 330 can perform functions discussed herein. That is, at least to some extent, a function that is discussed herein as being performed via a particular one of these devices can be performed by a different one of these devices, by a combination of these devices, and/or by other devices.

Fingerprint validation system 360 may include a fingerprint association module 362, a ticket association module 364, a notification module 365, a comparison module 366, a validation or authentication module 368, an access module 370, a network interface module 372, and a storage module 374. Any or all of the modules may be implemented as a subsystem of fingerprint validation system 360 including a circuit, a hardware component, a hardware subcomponent, and/or a variety of other subsystems known in the art. Furthermore, any or all of the modules may be preconfigured to perform their disclosed functionality, or may be configured by a processing system "on-the-fly" or as needed to perform their disclosed functionality. As such, any or all of the modules may include preconfigured and dedicated circuits and/or hardware components, or may be circuits and/or hardware components that are configured as needed.

For example, any or all of the modules may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause the modules to perform the functions described below. As such, in some embodiments, preconfigured and dedicated circuits may be implemented to perform the functions of the modules. In other embodiments, a processing system may execute instructions on a non-transitory, computer-readable medium to configure one or more circuits as needed to perform the functions of the modules.

Fingerprint association module 362 may be included as a separate module provided in fingerprint validation system 360, or may be provided using instructions stored on a computer-readable medium that, when executed by a processing system in fingerprint validation system 360, configure fingerprint association module 362 to store a fingerprint template of a user as a reference fingerprint template associated with the user, as well as provide any of the other functionality that is discussed herein. In an embodiment, fingerprint association module 362 may include a feature extractor module configured to extract features from a fingerprint sample (e.g., a scanned fingerprint image) received from user device 320, and a template generator module configured to generate a fingerprint template (e.g., fingerprint data indicating relevant features and/or characteristics) using the extracted features. Relevant features that are extracted from the fingerprint sample may include, for example, patterns (e.g., characteristics of ridges) and/or minutia points (e.g. unique features within the patterns). In other embodiments, the feature extractor module and the template generator module may be included in user device 320, and fingerprint association module 362 may receive a fingerprint template from user device 320.

Ticket association module 364 may be included as a separate module provided in fingerprint validation system 360, or may be provided using instructions stored on a computer-readable medium that, when executed by a processing system in fingerprint validation system 360, configure ticket association module 364 to associate a user with a purchased ticket to an event in response to the user purchasing the ticket, as well as provide any of the other functionality that is discussed herein.

Notification module 365 may be included as a separate module provided in fingerprint validation system 360, or may be provided using instructions stored on a computer-readable medium that, when executed by a processing system in fingerprint validation system 360, configure notification module 365 to send a notification to user device 320 that includes a request for approval and/or validation by providing a fingerprint scan on the user device 320, as well as provide any of the other functionality that is discussed herein.

Comparison module 366 may be included as a separate module provided in fingerprint validation system 360, or may be provided using instructions stored on a computer-readable medium that, when executed by a processing system in fingerprint validation system 360, configure comparison module 366 to compare a fingerprint template of a user with reference fingerprint templates, as well as provide any of the other functionality that is discussed herein. In an embodiment, comparison module 366 may include a matcher module configured to generate a matching score based on comparing the fingerprint template of the user with one or more of the reference fingerprint templates.

Validation module 368 may be included as a separate module provided in fingerprint validation system 360, or may be provided using instructions stored on a computer-readable medium that, when executed by a processing system in fingerprint validation system 360, configure validation module 368 to validate that a user is associated with a purchased ticket based on a comparison by comparison module 366, as well as provide any of the other functionality that is discussed herein. Validation module 368 may validate the user by identifying the user and/or authenticating the user as a purchaser of a ticket to an event based on the matching score (e.g. a matching score being above a predetermined threshold, which may be set, for example, by the service provider).

Access module 370 may be included as a separate module provided in fingerprint validation system 360, or may be provided using instructions stored on a computer-readable medium that, when executed by a processing system in fingerprint validation system 360, configure access module 370 to grant access to a user in response to validation by validation module 368 by, for example, transmitting an access granting signal (e.g., access granting data packet) to an automated entrance gate, as well as provide any of the other functionality that is discussed herein.

Network interface module 372 is communicatively coupled to network such as Internet 340, and may be communicatively coupled to any or all of modules 362, 364, 366, 368, and/or 370, any of which may be coupled to a storage module 374. Network interface module 372 may be included as a separate module provided in fingerprint validation system 360, or may include communications hardware (e.g., antennas) and instructions stored on a computer-readable medium that, when executed by a processing system in fingerprint validation system 360, configure network interface module 372 to operate the communications hardware to send and receive data and/or information over Internet 340, as well as provide any of the other functionality that is discussed herein.

Storage module 374 may include one or more databases, such as a template database 376 containing fingerprint templates and/or fingerprint samples (e.g., fingerprint images) associated with respective users, and/or an account database 378 containing account information (e.g., personal information, banking information, financial information, funding source information, etc.), Fingerprint templates of each user may be associated with, or included in, the account information of each user. While storage module 374 has been illustrated as located in fingerprint validation system 360, one of skill in the art will recognize that it may include multiple storage modules and may be connected to other modules through network such as Internet 340 without departing from the scope of the present disclosure. Other modules discussed herein but not illustrated in FIG. 3 may be provided as separate modules on fingerprint validation system 360, or using instructions stored on a computer-readable medium similarly as discussed above.

Fingerprint validation system 360, in various embodiments, may be a separate hardware server or device or may be provided, at least in part, by venue device 310 and/or service provider server 330.

Venue device 310, user device 320, other mobile devices, service provider server 330, and/or fingerprint validation system 360 can communicate with one another via a network, such as Internet 340 or with one another via one or more networks, such as LANs, WANs, cellular telephone networks, and the like. Venue device 310, mobile devices such as user device 320, service provider server 330, and other devices can communicate with one another, at least partially, via one or more near field communications (NFC) methods or other short range communications methods, such as infrared (IR), Bluetooth, WiFi, and WiMax.

When a user wishes to shop for tickets online, resell tickets online, check in at a venue such as an event venue online, access electronic tickets online, provide location information online, and/or provide fingerprint data online (as examples), the user can open an online ticket seller's website or can access the ticket seller using an application such as app 325. The user can open the ticket seller's website using user device 320, for example. The ticket seller's website can be hosted on service provider server 330, venue device 310, or on any other server or device.

An event venue may be any venue for which an attendee can purchase access (e.g., ticketed access) to particular locations or portions within the venue for a period of time. Without being limiting examples of event venues may include a stadium, a theater, an arena, an amphitheater, an airplane, a train, a hotel, or any another venue into which an attendee can purchase access.

Figure 4:
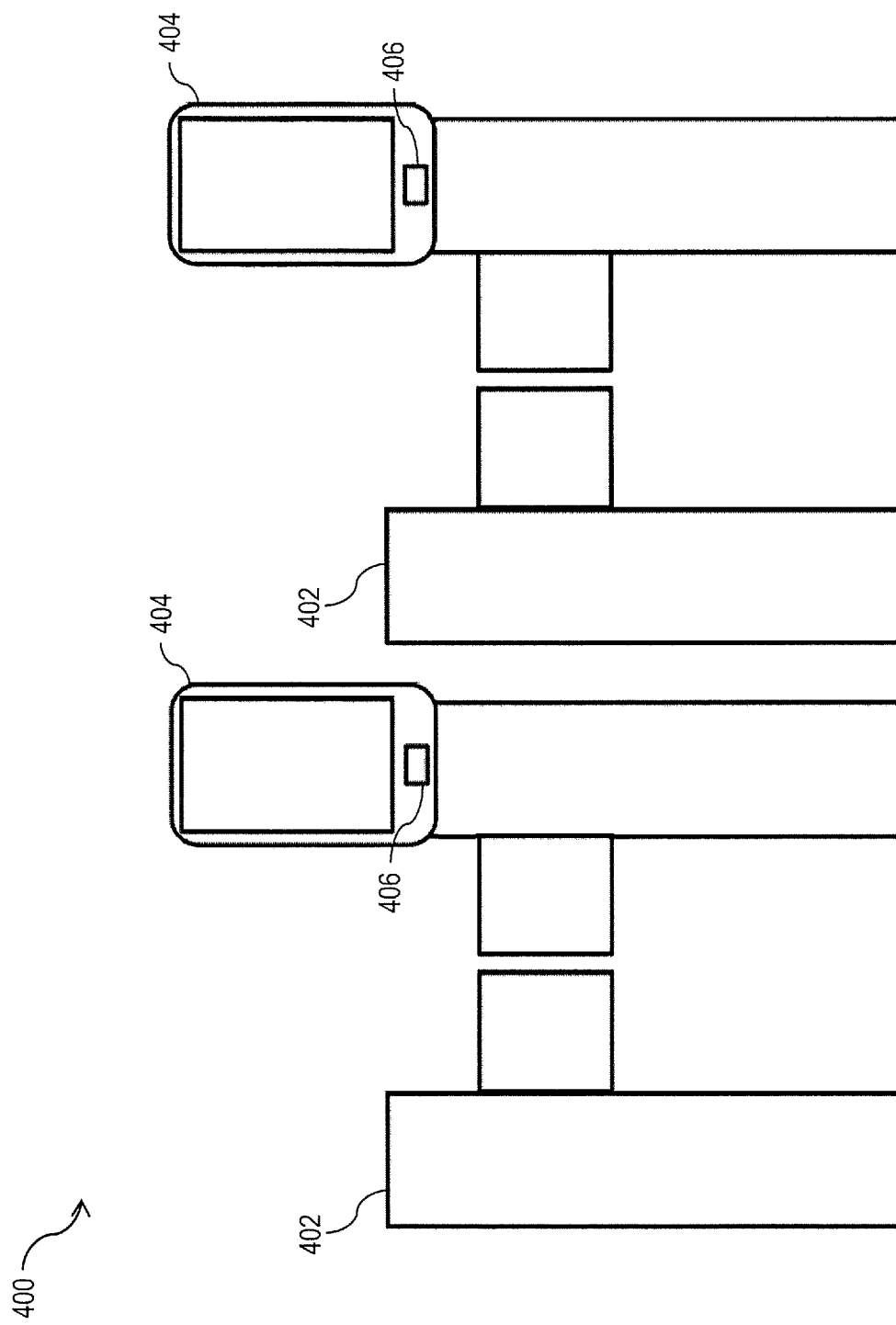
FIG. 4 is a diagram of an illustrative event entrance showing fingerprint scan devices according to an embodiment.

Referring now to FIG. 4, a diagram 400 of event entrance gates 402 (e.g., a venue entrance gate) with fingerprint scan devices 404 configured to scan fingerprints is illustrated according to an embodiment. Event entrance gates 402 may be automated entrances gates, such as automated turnstile entrance gates. Fingerprint scan devices 404 may be an implementation of fingerprint scan device 314 in FIG. 3. Each fingerprint scan device 404 may comprise a fingerprint scan area 406, which may be separate from or on the display of fingerprint scan device 404. Each fingerprint scan device 404 may be associated with a respective event entrance gate 402.

Figure 5:
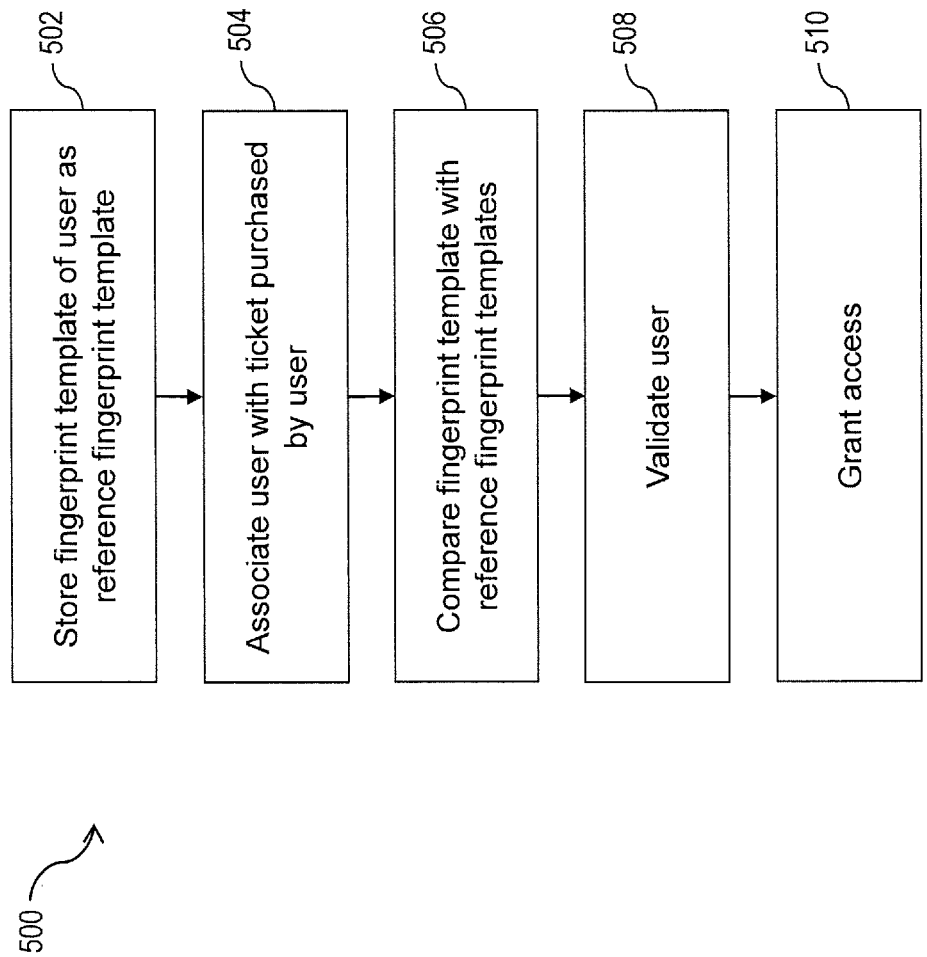
FIG. 5 is a flowchart showing an illustrative process that may be performed for using fingerprint recognition for event admission according to an embodiment.

Referring now to FIG. 5, a flowchart 500 of a method for using fingerprint recognition for event admission is illustrated according to an embodiment of the present disclosure.

At block 502, fingerprint validation system 360 (e.g., using fingerprint association module 362) stores a fingerprint template that is based on a fingerprint scan on a user device as a reference fingerprint template. In various embodiments, a user may scan his or her fingerprint using fingerprint scan module 324 and/or app 325. User device 320 may generate a fingerprint sample (e.g., a fingerprint image) in response to the scan. User device 320 may then transmit fingerprint data to fingerprint validation system 360.

In an embodiment, user device 320 may transmit the fingerprint sample to fingerprint validation system 360. Fingerprint validation system 360 may generate a fingerprint template by extracting features from the fingerprint sample, and store the fingerprint template associated with the user as a reference template in template database 376 of storage module 374.

In another embodiment, user device 320 may generate a fingerprint template by extracting features from the fingerprint sample, and transmit the fingerprint template to fingerprint validation system 360. Fingerprint validation system 360 may store the fingerprint template associated with the user as a reference template in template database 376 of storage module 374.

At block 504, fingerprint validation system 360 (e.g., using ticket association module 364) associates the user with a purchased ticket in response to the user purchasing the ticket. In an embodiment, the user may use user device 320 to view, select, and purchase a ticket for an event on a service provider website hosted by service provider server 330 or using a service provider application such as app 325. Service provider server 330 may process a transaction for the purchase of the ticket. Fingerprint validation system 360 may receive and/or access the ticket purchase information (e.g., from service provider server 330) and store an association between the purchased ticket and the user in account database 378 of storage module 374.

In another embodiment, fingerprint validation system 360 associates another user with the ticket purchased by the user. For example, the other user may have received the ticket as a gift from the purchasing user, bought the ticket from the purchasing user, traded for the ticket from the purchasing user, had the ticket purchased by the purchasing user on the other user's behalf, or ways to acquire the ticket purchased by the user. The purchasing user may identify the other user, such as by entering a user identifier (e.g., name, phone number, email address, etc.). Fingerprint validation system 360 may then access a database, account, or other source to match the user identifier with a stored fingerprint corresponding to the user identifier. If no stored fingerprint is found, the other user may be notified, such as by phone call, email, or text, and requested to provide a fingerprint sample, such as described herein.

At block 506, fingerprint validation system 360 (e.g., using comparison module 366) compares a fingerprint template that is based on a fingerprint scan on a fingerprint scan device 314 located at an entrance for the event (e.g., an entrance to the event venue) with reference fingerprint templates. Fingerprint validation system 360 may search for a match among the reference fingerprint templates and/or generate matching scores for each comparison.

At block 508, fingerprint validation system 360 (e.g., using validation module 368) validates that the user (or person having his/her fingerprint scanned at the event) is associated with the purchased ticket based on the comparison. In an embodiment, fingerprint validation system 360 validates the user by identifying and/or authenticating the user based on the comparison. In certain embodiments, fingerprint validation system 360 may compare the fingerprint template with fingerprint templates of a plurality of users who each purchased a ticket for the event to which the user is seeking admission.

In an embodiment, fingerprint validation system 360 may determine a matching score for each comparison and identify user as one of the plurality of users based on determining one of the matching scores being above a predetermined threshold.

At block 510, fingerprint validation system 360 (e.g., using access module 370) grants the user access to the event based on the validation. In an embodiment, fingerprint validation system 360 transmits an access granting signal to an automated entrance gate (e.g., gate 402 of FIG. 4) associated with the fingerprint scan device 314 at which the user scanned his or her fingerprint. For example, the automated entrance gate (e.g., automated turnstile entrance gates) may move or turn a part of the gate, or allow the user to move or turn a part of the gate, so that the user may pass through.

In some embodiments, the user may have purchased a plurality of tickets for the user and one or more other users. Based on a fingerprint scan by the user on the fingerprint scan device, fingerprint validation system 360 may grant access to the user and also the one or more other users (e.g., by counting the number of users passing through and allowing a plurality of users pass through corresponding to the number of tickets purchased). Accordingly, the fingerprint template of the user may be associated with the transaction for the purchase of multiple tickets, and the validation of one user may allow a plurality of users to enter the event.

Referring now to FIG. 6, a flowchart 600 of a method for using remote fingerprint recognition for event admission is illustrated according to an embodiment of the present disclosure.

At block 602, fingerprint validation system 360 (e.g., using fingerprint association module 362) stores a fingerprint template that is based on a fingerprint scan on a user device as a reference fingerprint template, as described at block 502 in FIG. 5.

At block 604, fingerprint validation system 360 (e.g., using ticket association module 364) associates the user with a purchased ticket in response to the user purchasing the ticket, as described at block 504 in FIG. 5. The user may have bought the ticket for another user. The user may tell the other user that the user has bought a ticket for the other user. The user advantageously does not have to give the other user a physical ticket (e.g., a paper ticket) or electronically send proof of purchase of the ticket (e.g., an electronic ticket). The user merely has to let the other user know, which is convenient for both users.

At block 606, fingerprint validation system 360 receives user identifier information for the user and the other user. In an embodiment, the other user enters the user identifiers on fingerprint scan device 314. The user identifier for the user may include a phone number, an email address, a username, or other user identifier stored with fingerprint validation system 360 and/or service provider server 330. The user identifier for the other user who seeks admission into the event may include a name or any identifier that the user would recognize as being from the other user. As such, when the user receives the user identifier for the other user, the user can be sure that the person at the entrance who is trying to use the ticket purchased by the user is the other user.

At block 608, fingerprint validation system 360 (e.g., using notification module 365) sends a notification, which may include a request for approval and/or validation, to user device 320 of the user. In various embodiments, fingerprint validation system 360 may determine a user account using the user identifier for the user by searching account database 378. Fingerprint validation system 360 may then determine whether the user associated with the user account is associated with a purchased ticket for the event. Fingerprint validation system 360 may transmit a notification to the user via user device 360. The notification may include the user identifier of the other user (e.g., a name, nickname, phone number, an email address, or other information that would allow the user to determine the other user is at the entrance) and a request for the user to approve the other user's use of the ticket. In an embodiment, user may approve by validating that the user holding user device 320 is associated with the purchased ticket by providing a fingerprint scan on user device 320. In other embodiments, the user may approve without providing further validation (e.g., providing a fingerprint scan), such as by entering a "approve" button.

At block 610, fingerprint validation system 360 (e.g., using comparison module 366) compares a fingerprint template that is based on a fingerprint scan on user device 320, which may be located remotely from the entrance for the event, with one or more reference fingerprint templates. In an embodiment, fingerprint validation system 360 may compare a fingerprint template based on a fingerprint scan on user device 320 with reference templates by searching for a match among the reference fingerprint templates and/or generating matching scores for each comparison. In other embodiments, fingerprint validation system 360 compares the fingerprint template that is based on a fingerprint scan on user device 320 with a stored reference template of the user, which may be determined, for example, based on the user identifier for the user provided by the other user.

At block 612, fingerprint validation system 360 (e.g., using validation module 368) validates that the user is associated with the purchased ticket based on the comparison, as described at block 508 in FIG. 5.

At block 614, fingerprint validation system 360 (e.g., using access module 370) grants the other user access to the event based on the approval and/or the validation. In an embodiment, fingerprint validation system 360 transmits an access granting signal to an automated entrance gate associated with the fingerprint scan device 314 at which the other user entered the user identifiers.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A system, comprising:
    a fingerprint validation system, including:
        an association module configured to transmit a notification to a user device of a first user, the notification including a request for approval of a second user to use a purchased ticket associated with the first user to enter an event in response to receiving a user identifier for the first user, wherein the request for approval includes a request to provide a fingerprint scan by the first user on the user device;
        a comparison module configured to compare the fingerprint scan of the first user with a stored reference fingerprint template of the first user; and
        an access module configured to grant a second user access to the event when the fingerprint scan matches the stored reference fingerprint template; and
    a fingerprint scan device associated with a venue of the event, the fingerprint scan device configured to receive the user identifier entered on the fingerprint scan device by the second user.

2. The system of claim 1, wherein the notification further includes a user identifier for the second user entered on the fingerprint scan device.

3. The system of claim 1, further comprising a fingerprint association module configured to store the reference fingerprint template associated with a previous fingerprint scan of the first user.

4. The system of claim 3, wherein the fingerprint association module receives the reference fingerprint template from the user device.

5. The system of claim 4, wherein the fingerprint association module receives the previous fingerprint scan from the user device and generates the reference fingerprint template by extracting features from the fingerprint scan.

6. The system of claim 3, further comprising a ticket association module configured to associate the first user with the purchased ticket to the event in response to the first user purchasing the ticket.

7. The system of claim 4, further comprising a validation module configured to validate the first user is associated with the purchased ticket based on the comparison.

8. The system of claim 1, wherein the fingerprint scan device is associated with an automated entrance gate at the entrance, and wherein the access module is configured to grant access to the event by transmitting an access granting signal to the fingerprint scan device or the automated entrance gate.

9. A processor-implemented method, comprising:
performing, by a first processor, the operations of:
  transmitting a notification to a user device of a first user, the notification including a request for approval of a second user to use a purchased ticket associated with the first user to enter an event in response to receiving a user identifier for the first user, wherein the request for approval includes a request to provide a fingerprint scan by the first user on the user device;
  comparing the fingerprint scan of the first user with a stored reference fingerprint template of the first user; and
  granting a second user access to the event when the fingerprint scan matches the stored reference fingerprint template; and
  receiving, by a fingerprint scan device coupled to the first processor, the user identifier entered by the second user.

10. The processor-implemented method of claim 9, wherein the notification further includes a user identifier for the second user entered on the fingerprint scan device.

11. The processor-implemented method of claim 9, further comprising storing the reference fingerprint template associated with a previous fingerprint scan of the first user.

12. The processor-implemented method of claim 11, further comprising receiving the reference fingerprint template from the user device.

13. The processor-implemented method of claim 12, further comprising receiving the previous fingerprint scan from the user device and generating the reference fingerprint template by extracting features from the fingerprint scan.

14. The processor-implemented method of claim 11, further comprising associating the first user with the purchased ticket to the event in response to the first user purchasing the ticket.

15. The processor-implemented method of claim 12, further comprising validating the first user is associated with the purchased ticket based on the comparison.

16. The processor-implemented method of claim 9, further comprising granting access to the event by transmitting an access granting signal to the fingerprint scan device or an automated entrance gate.

17. A processor-implemented method, comprising:
  storing reference fingerprint templates associated with respective users;
  storing a first fingerprint template of a first user as one of the reference fingerprint templates, wherein the first fingerprint template is based on a first fingerprint scan on a user device;
  associating the first user with a purchased ticket to an event in response to the first user purchasing the ticket;
  transmitting a notification to a user device of the first user, the notification including a request for approval of a second user to use the purchased ticket associated with the first user to enter the event in response to receiving a user identifier for the first user, wherein the request for approval includes a request to provide a fingerprint scan by the first user on the user device;
  comparing a second fingerprint template of the first user with the reference fingerprint templates, wherein the second fingerprint template is based on a second fingerprint scan on a fingerprint scan device at an entrance for the event;
  validating the first user is associated with the purchased ticket based on the comparison; and
  granting access to the event based on the validation.

18. The processor-implemented method of claim 17, further comprising comparing the first fingerprint template with the reference fingerprint templates by determining a matching score, and identifying the first user based on the matching score being above a predetermined threshold.

19. The processor-implemented method of claim 17, further comprising receiving ticket purchase information for the purchased ticket from a service provider server.

20. The processor-implemented method of claim 17, wherein the granting access further comprises granting access to the event to a plurality of users based on the validation.

* * * * *